UNITED STATES PATENT OFFICE.

HARRY O. CHUTE, OF NEW YORK, N. Y.

PROCESS OF RECLAIMING RUBBER.

1,196,334.  Specification of Letters Patent.  Patented Aug. 29, 1916.

No Drawing.  Application filed June 3, 1913.  Serial No. 771,534.

*To all whom it may concern:*

Be it known that I, HARRY O. CHUTE, a citizen of the United States, residing at New York, in the county of New York and State of New York, have invented certain new and useful Improvements in Processes of Reclaiming Rubber, of which the following is a specification.

This invention relates to processes of reclaiming rubber; and it comprises a method wherein waste rubber or rubber scrap is methodically treated in a series of successive operations to effect reclamation and the formation of a plastic rubber material substantially free of fiber and containing substantially no more combined sulfur than the original scrap, such method comprising a low-temperature operation for attacking the fiber with the aid of mineral acids in the presence of haloid mineral salts, a low temperature operation for removing free sulfur with the aid of alkalis or other sulfur-solvents and a final plasticization at high temperature in the absence of any substantial amount of reactive chemicals; all as more fully hereinafter set forth and as claimed.

Waste rubber scrap is a material of widely varying composition and characteristics. Rubber boot and shoe scrap usually carries considerable fabric or fiber, which is mainly cotton but may also be, in part, wool. The rubber is lightly vulcanized and contains little or no free sulfur and but little filler. Auto tire carcasses carry much fabric, which is usually cotton duck, and the rubber contains about 2.5 per cent. free sulfur and about 2.5 per cent. combined sulfur. There is a considerable amount of filler which is usually a material of basic nature, such as zinc oxid. Inner tubes of good quality are usually composed of high grade rubber and sulfur, some of the sulfur being free. They do not contain fabric or fiber and have little or no filler. Garden hose and fire hose have large proportions of fabric and filler and the rubber is not usually of high grade and may contain much reclaimed rubber and rubber substitute. Some scrap is really more in the nature of rubber-coated fabric than of fabric-reinforced rubber. The fiber is generally present as some form of fabric; and is usually cotton. Many kinds of scraps contain large amounts of fillers which may be basic materials, like zinc oxid, lead oxid, whiting, etc., or more or less indifferent material like iron oxid, soap-stone, barytes, lithopone, etc. More or less "rubber substitute" or "factis" is frequently present in lower grade goods and this is generally some form of blown, oxidized or sulfured drying oil, such as linseed oil or corn oil. Tar is often present.

In making rubber articles sulfur in the desired amount is incorporated with a plastic rubber or rubber composition, as by kneading, the article is shaped or formed and is then cured or vulcanized by exposure to heat. The temperature employed and the time of exposure vary considerably with different articles and with the composition, but generally a heat corresponding to about 40 pounds steam pressure, or about 286° F., for, say, 30 minutes is employed. Under the influence of the heat part of the sulfur enters into various chemical and chemico-physical combinations with the rubber while owing to the limited time of exposure part remains in a free state. The longer the heating is continued the harder the goods become and the greater is the proportion of combined sulfur. If the heat be raised to that corresponding to, say, 125 pounds steam pressure, or about 350° F., and continued for several hours there is an opposite effect: The rubber tends to again become soft and plastic. At these high temperatures while the sulfur continues to go into combination with the rubber, its effect is neutralized or masked by the physical change of plasticization or, as it is sometimes termed, depolymerization.

In cured or vulcanized rubber and, consequently, in rubber waste, the sulfur exists in several states which may be here defined as the free sulfur, that is the sulfur which has no other function than acting as a filler as would any other mineral matter, the sulfur which may be loosely combined or existing as a colloid in a solid solution and the firmly combined sulfur, that is the sulfur which cannot be removed by alkalis or other sulfur solvents without a treatment drastic enough to injure or destroy the rubber itself. It is to this firmly combined sulfur that the characteristic effects of the vulcanization appear to be due. While vulcanized rubber may be plasticized and then further vulcanized, it cannot be devulcanized in the strict sense of the word; in the sense that any of this firmly combined sulfur can be removed.

Generally speaking, it may be said that every treatment or handling of rubber injures its quality. Mechanical working injures it and treatment with acid and with alkalis also injure it. All these facts must be taken into consideration in reclaiming rubber. The various treatments must be comparatively mild in character to avoid injury to the properties of the rubber and the material should not be exposed to a vulcanizing temperature at any time when there is still free or loosely combined sulfur present. While the firmly combined sulfur cannot be removed it is a distinct desideratum not to allow any increase in its amount. The various treatments should remove fabric, ruber substitute and sulfur, but it is ordinarily not particularly desirable to remove mineral fillers. After the purifying treatments the rubber should be plasticized to give a soft plastic material which can be readily reworked. In the absence of free sulfur this may be safely done by exposure to high temperature steam or water.

The object of reclamation is to produce a plastic rubber material which can be again vulcanized and worked, either by itself or in conjunction with fresh or new rubber. And the effort in any process of reclaiming should be to accomplish the desired result of forming a plastic, workable material as sensitive as possible to the action of sulfur in revulcanizing and to do this with the absolute possible minimum of working or treatment.

In rubber reclamation in the present art, the treatments adopted are generally either too drastic or are inefficient, and commercial reclaimed rubber is, for that reason, not of as good quality as it might be. In one method the scrap is boiled with acid, and is then plasticized by prolonged treatment with steam under pressure of, say, 125 to 150 pounds, or with correspondingly hot water. The acid removes the fiber and fabric in this treatment by converting them into soluble bodies such as sugars, but has no effect on the sulfur while the heat steadily increases the amount of firmly combined sulfur in the material. Any remaining traces of acids are very injurious during plasticization and subsequently. Sometimes reclamation is by a single-stage operation, the scrap being heated with a solution of caustic alkali at a plasticizing temperature, say that corresponding to about 125 pounds steam pressure. As fiber in its natural state is only slowly attacked by alkali, the operation requires some 20 hours' heating during which the character of the rubber suffers materially. Though much free sulfur is removed by the alkali yet as the alkali penetrates the body of the rubber comparatively slowly while the temperature is very high opportunity is afforded for much sulfur to go into a firmly combined state before the alkali can reach and attack it. Both acid and alkali reclaimed rubber contain a greater proportion of combined sulfur than the original scrap; the reclaimed material is, so to speak, further advanced in vulcanization in the sense of containing a greater proportion of such combined sulfur and is, to that extent, less susceptible to the action of sulfur when the material is again subjected to vulcanization in re-use.

I have found that the desired result of producing a high grade reclaimed rubber in a plastic state with little damage to its character and with good susceptibility to the action of sulfur in revulcanizing can be attained by using a combined treatment. After suitably comminuting, I first treat the scrap with a mineral acid, and best in the presence of a haloid salt, at a comparatively low temperature for a short time; the time and temperature not being sufficient necessarily to convert the cellulose or fiber wholly into soluble forms. The complete removal of fiber can be effected in the next stage. This acid operation is at a temperature too low to allow any rapid change of the free sulfur into combined sulfur, that is, is below a rapid vulcanizing temperature; and is best around 212° F. I then treat the material with alkali solution, or other sulfur solvent, for the purpose of removing the sulfur and conduct this operation also for a short time at a relatively low temperature; a temperature which is, again, too low to allow any substantial change in the state of the sulfur. A dilute solution of caustic soda is well adapted for this purpose. While alkali solutions do not readily dissolve and remove cellulose fiber, such as cotton in its natural state, (the state in which it occurs in cotton duck for instance), yet after cellulose has been given a preliminary treatment with acid to convert it into the forms known as oxycellulose, hydrocellulose, etc., it then becomes soluble in alkali. Its solution is comparatively easy at boiling temperature and there is not required the inordinate period of exposure to high temperatures which is necessary where an alkali solution is directly brought into contact with raw rubber scrap for the purpose of removing fiber and sulfur in one operation. Having removed the free sulfur by the alkali, I then wash or otherwise treat the scrap to get rid of the alkali as far as possible and then plasticize by steam, or by water under pressure, at a high temperature, say around 350° F. The free sulfur having been removed, this high temperature while producing the necessary plasticization does not induce the formation of any further amount of combined sulfur than that already present, as is the case where scrap containing free sulfur is at once exposed to high temperatures. After the plasticization, the material can be made into a good quality of reclaimed rubber.

In the acid treatment, I use a relatively dilute acid. In this operation, the halogen acids are better adapted than the other mineral acids; but I find that for a number of reasons it is better to develop this halogen acid in the solution itself rather than add preformed acid. And I have found that the presence of some quantity of a halogen salt is useful. While I may use a solution of a halogen salt, such as chlorid of sodium, zinc chlorid, etc., with a direct addition of hydrochloric acid, I find it better to use salt, chlorid of calcium, etc., in the presence of sulfuric acid. With chlorid of calcium and weak sulfuric acid advantageous results may be attained. This mixture gives some insoluble sulfate of calcium but some of this remains in the rubber and is useful as a filler. Advantageously, the rubber scrap may be first treated with one solution, as with the acid, and then with the other, as with the solution of calcium chlorid, in making the bath in which the fabric or fiber is to be converted. A good strength of acid, using sulfuric acid, is about 3 to 4 per cent. Enough chlorid of calcium in solution should be used to give an excess over the amount chemically equivalent to the sulfuric acid since it is desirable to have some chlorid of calcium present. The rubber scrap or waste may be boiled in this solution for about two hours. The temperature may be about 212° F. or a little above. Open or closed vats may be used, and wooden tubs are suitable. Live steam may be admitted through a perforated lead pipe. A stirrer is desirable.

The rubber waste should be ground or comminuted when exposed to the acid treatment but it is better that it be brought to this fine state by some form of cutting operation rather than grinding or shredding. As stated, the less the scrap is worked the better is the quality of the rubber recovered and cutting involves less mechanical working of the rubber.

The end of the operation is marked not by the total disappearance of the fiber but by a certain change occurring in it, that resulting in the formation of "oxycellulose" or "hydrocellulose". This change is sometimes described as "rotting" or "burning". The fiber then assumes a peculiar feel and appearance readily observed by the skilled workman while fabric disappears as such. When the conversion is pushed to this point, the acid and salt solution may be removed. It is difficult to secure a sufficient removal by any simple washing operation since portions of liquid are inclosed by the rubber material and are not easily reached by washing water. For this reason, the acid-treated material is best next run through some form of squeezer; something in the nature of a sausage machine. The material after the first squeezing may be re-wet with water or alkali and again pressed. It is advantageous, but not always necessary, at this stage to neutralize the remaining acid. This may be done by sprinkling the scrap with lime, or whiting, or working up with milk of lime or sodium carbonate. The next stage is the removal of remaining fiber and of the free sulfur and loosely combined sulfur. This is done by the action of boiling alkali. After the described acid treatment, the cellulose, though not originally soluble in weak alkali, becomes so soluble and may therefore be conveniently removed at the same time as sulfur. The best alkali to use is a strong caustic soda solution; a solution of about 10 per cent. NaOH. The temperature in alkali treatment is important. It is advantageously at or above the melting point of sulfur, for instance, 15 to 20 pounds steam pressure, say 250° to 260° F., but should be below the ordinary rapid vulcanizing temperature which is about 40 pounds pressure, say 285° to 290° F. The alkali treatment may be at somewhat lower temperatures, say between 212° F. and 240° F., but the operation takes longer. Heating may be with a gradual rise in temperature beginning at, say, 212° F. and rising slowly to 250° or 260° or higher. But the temperature in this operation should never be allowed to reach or exceed the vulcanizing temperature until all the sulfur which can be removed by soda has gone into solution. The operation may be conducted in any type of vessel capable of withstanding these low pressures. An ordinary iron or steel tank is sufficient. There should be at least enough of the caustic soda solution to cover the material and absorb the sulfur. The time of treatment with the alkali solution will vary very much with the particular kind of scrap on which the operation is performed, and must be left to the skilled operator. For ordinary high grade rubber scrap carrying about 3 per cent. of free sulfur, substantially all the free and loosely combined sulfur can be removed in about two hours of heating. Grades containing more sulfur and of higher vulcanization will take considerably longer time. The time depends somewhat on the fineness of division of the scrap. Vigorous stirring is desirable.

The next operation is to plasticize the rubber and render it suitable for re-working. As the action of alkali on rubber at the temperatures necessary for plasticization is markedly detrimental, I therefore remove the alkali as completely as practicable after the sulfur removing stage and prior to plasticization. On leaving the alkali bath, the scrap rubber is still in the original small granules and the same difficulty of removing the alkali solution appears that is found in removing the acid in the first treatment. The solution is therefore best removed in much the same way; that is by the use of some form of squeezing machine. The washed rubber at this stage no longer contains free or loosely combined sulfur but it still contains the firmly combined sulfur. It is substantially free from reactive chemicals. It is not plastic and is not as yet suitable for re-working. It is next exposed to the plasticization temperature which is around that corresponding to about 125 to 150 pounds steam pressure, or, say, 350 to 365° F. To this end, the squeezed and washed rubber may be covered with water and put in any suitable digester, which may be of steel or iron, and then exposed to inflowing steam under pressure. Coil or jacket steam may be used instead. With injected steam, some of the steam should be vented off to allow a continuous flow through the apparatus and in any event the apparatus should be provided with a vent, as by having a safety valve set at the required pressure, but approximately the stated temperature and pressure should be maintained. The apparatus should be provided with a stirrer and agitation maintained. About six hours' heating are ordinarily sufficient, but with special materials and for special purposes the times and temperatures may be widely varied. Where material is desired that is not much softened or plasticized, then the time of exposure may be shortened. On the other hand, with material which was originally quite hard or where a high degree of plasticity is desired, the time of heating in this operation may be increased. Much will depend upon the judgment of the skilled workman. Other things being equal, and within reasonable limits, time of exposure and temperature are reciprocal.

A relatively large quantity of water should be used, this being desirable as increasing the uniformity of heating. It has the further useful effect of highly diluting any alkali which may have remained after the alkali treatment and squeezing. This trace of alkalinity may be neutralized with a little acid. However, a little residual alkali in the high dilution given by the water in this operation is not very harmful.

After completing the plasticization the material may be dried and homogenized. For drying it may be spread on wire gauze shelves or trays, and dried by a circulation of warm air. It may then be sheeted on warmed rolls. The rubber so obtained is soft and plastic and may be worked in the same way as raw rubber. It is materially better than rubber treated with alkali or other chemicals at high temperatures as in ordinary methods. It still contains the firmly combined sulfur but is ready to take up new additional sulfur; in other words, it may be revulcanized.

It has been found advantageous to add certain oils and preservative materials, such as creosote, naphthalene, pyroligneous acid, wood tar, etc., to the material. The finished material may be treated with these substances but it is better to add them in the plasticizing operation. It is particularly beneficial to add such substances as phenol or creosote in the final operation to neutralize the remaining alkali.

Using caustic soda with the usual run of rubber scrap a solution of about 10 per cent. works very well; but with rubber high in free sulfur or containing much rubber substitute made of saponifiable oils stronger solutions are necessary. With lightly sulfured or hard rubbers weaker solutions may be used. Other alkalis and sulfur solvents may be employed. Caustic potash works well. Carbonates of soda and potash may be used but are not as advantageous as the caustic alkalis. Sodium monosulfid and various other soluble sulfids may be used. Solutions of sodium sulfite, though not alkaline, are equivalent for this purpose since they will dissolve sulfur. However, caustic soda on the whole appears the best material to employ. Caustic soda solutions after use may be evaporated, burnt and reutilized; or by appropriate methods impurities may be precipitated from the solution rendering the lye directly adapted for reuse.

What I claim is:—

1. In the reclamation of rubber, the process which comprises treating scrap with dilute acid at a temperature below the vulcanizing temperature, boiling with a caustic alkali solution at a temperature below the vulcanizing temperature, removing the alkali and plasticizing in highly heated water.

2. In the reclamation of rubber, the process which comprises treating scrap with a halogen acid at a temperature below the vulcanizing temperature, treating with an alkali solution at a temperature below the vulcanizing temperature, removing the alkali and plasticizing in highly heated water.

3. In the reclamation of rubber, the process which comprises treating scrap with a halogen acid in the presence of a haloid salt at a temperature below the vulcanizing temperature, treating with a caustic alkali solution at a temperature below the vulcanizing temperature, removing the alkali and plasticizing in highly heated water.

4. In the reclamation of rubber, the process which comprises treating scrap with a bath made of sulfuric acid and an excess of a solution of a soluble chlorid at a temperature below the vulcanizing temperature, treating with a caustic alkali solution at a temperature below the vulcanizing temperature, removing the alkali and plasticizing at a high temperature.

5. In the reclamation of rubber, the process which comprises treating scrap with a bath made of sulfuric acid and an excess of calcium chlorid at a temperature below the vulcanizing temperature, treating with a caustic alkali solution at a temperature below the vulcanizing temperature, removing the alkali and plasticizing at a high temperature.

6. The process of reclaiming scrap rubber which comprises boiling the same in a solution containing an acid and a halogen salt to disintegrate contained fabric, desulfurizing by boiling in strong alkali at a temperature below the vulcanizing temperature, removing the alkali and plasticizing in highly heated water.

7. The process of reclaiming scrap rubber which comprises boiling the same in a solution containing an acid and a halogen salt to disintegrate contained fabric, desulfurizing by boiling in strong alkali at a temperature below the vulcanizing temperature and plasticizing in highly heated water containing phenol alkali compounds.

8. In the reclamation of rubber the process which comprises boiling rubber scrap with mineral acid, heating with caustic alkali solution to a temperature below the vulcanizing temperature of rubber, removing the alkali and thereafter heating to a high temperature in water.

9. In the reclamation of rubber the process which comprises boiling scrap rubber with mineral acid till contained fabric is disintegrated, heating with strong alkali solution at a temperature below the vulcanizing temperature of rubber till free sulfur and residual fiber are dissolved, removing the alkali and thereafter heating in highly heated water till the rubber is plasticized.

10. In the reclamation of rubber the process which comprises breaking up fiber in waste rubber by acid, removing broken up fiber and free sulfur by alkali below the vulcanizing temperature, removing the alkali and plasticizing by heating above the normal vulcanizing temperature in the presence of water vapor.

11. In the reclamation of rubber the process which comprises breaking up fiber in waste rubber by acid, removing broken up fiber and free sulfur by alkali below the vulcanizing temperature, removing the alkali and plasticizing by heating above the normal vulcanizing temperature in the presence of water vapor for a period around six hours.

In testimony whereof, I affix my signature in the presence of two subscribing witnesses.

HARRY O. CHUTE.

Witnesses:
J. H. SIGGERS,
K. P. McELROY.